2,858,282
METHOD OF MAKING LATEX SPONGE RUBBER

James T. Fairclough, Gastonia, N. C., assignor to United States Rubber Company, New York, N. Y., a corporation of New Jersey No Drawing. Application August 23, 1956
Serial No. 605,710

12 Claims. (Cl. 260—2.5)

The present invention relates to the manufacture of latex sponge rubber, more particularly chemically frothed rubber latex sponge.

According to the present invention, satisfactory latex sponge rubber can be made using as frothing agent for the latex chemicals heretofore used only as blowing agents for solid rubbers and plastics.

It has been found that certain blowing agents which liberate nitrogen on heating in the dry state will liberate nitrogen in an alkaline aqueous medium such as a rubber latex on heating and will simultaneously form acidic decomposition products which gel or coagulate the alkaline latex by reducing its pH to the point at which it forms an irreversible gel. Such chemicals which will decompose on heating in an aqueous alkaline medium liberating nitrogen and simultaneously form acidic decomposition products are azo-di-carbonamide formula $$(NH_2 \cdot CO \cdot N)_2$$

and aryl sulfonyl hydrazides, such as benzenesulfonylhydrazide, formula

p,p'-oxy-bis(benzenesulfonylhydrazide), formula

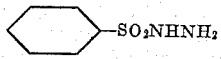

p,p'-methylene-bis (benzenesulfonylhydrazide) formula

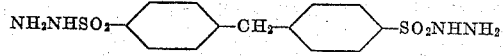

and p,p'-thio-bis(benzenesulfonylhydrazide), formula

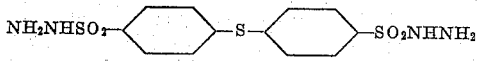

In carrying out the present invention, the alkaline latex is compounded with conventional vulcanizing agents, such as sulfur, zinc oxide and accelerator, and preferably a thickening agent to facilitate shaping the latex, as by spreading, and to prevent collapse of the foam structure during the initial expansion of the latex before gelling takes place, and the blowing agent as described above, generally in amount from 0.5 to 5 parts per 100 parts of rubber of the latex. The blowing agent may be added as such or in an aqueous dispersion, or dispersed in an oil or ester plasticizer. The thus prepared compound is then shaped as by knife spreading on a surface, which may be a metal surface if an unsupported sponge is to be made, or which may be a fabric or carpet if the sponge is to be a part of a composite article, for example a carpet backing. After shaping of the latex containing the blowing agent, it is heated at a temperature from 80° C. to 130° C. In the course of a few minutes, the latex is frothed or blown by liberation of nitrogen gas from the blowing agent at the elevated temperature and the thus formed froth is gelled by reduction of the pH of the latex to the gelling point by acidic reaction products from the blowing agent. Following the blowing and gelling, the frothed latex sponge rubber may be dried and vulcanized by conventional means. The alkaline latex composition will generally have a pH in the range of 9 to 11.5, preferably 10 to 11. It is preferred to age the latex compound containing the blowing agent at room temperature for 4 to 48 hours, particularly if the blowing is to take place in dry heat at 80° C. to 130° C. Where commercially feasible equipment wise, it is preferable to heat the shaped latex containing the blowing agent at 80° C. to 130° C. in an atmosphere of high humidity i. e., from 50% to 100%, and generally at least 70% humidity. In such cases, the aging of the latex compound containing the blowing agent can be dispensed with.

The invention is illustrated in the examples below, all parts and percentages being by weight:

Example I

A synthetic rubber latex copolymer of 75 parts of butadiene and 25 parts of styrene of 60% solids concentration was compounded according to the following recipe:

|  | Dry | Wet |
| --- | --- | --- |
| Latex | 100 | 167 |
| Zinc oxide | 3 | 5.5 |
| Sulfur | 2 | 4 |
| Accelerator | 1.5 | 3 |
| Antioxidant | 1 | 2.5 |
| Sodium polyacrylate | 0.5 | 5 |
| Methyl cellulose | 0.38 | 5 |

The sodium polyacrylate and methyl cellulose are thickeners for the latex. Just prior to spreading the latex 8 parts (wet) of a 25% aqueous dispersion of p,p'-oxy-bis(benzenesulfonylhydrazide) was mixed into the latex compound and the pH was adjusted to 10 to 10.5 with a small amount of ammonia. The viscosity of the latex composition was about 65,000 units Brookfield. This composition was spread on the back of a piece of woven woolen carpet, using a spreader knife adjusted to give a coating of latex between 2/32 and 3/32 inch, so that the final dry weight of the compound per square yard would be about 28–30 ounces. The coated carpet was placed in an oven controlled at 110–115° C. and with a relative humidity of about 95%. In six minutes the latex film was blown and gelled. The sponge coated fabric was then dried for 10 minutes at 80° C., and vulcanized for 20 minutes at 130° C. The finished sponge had a thickness of 3/16 to 4/16 inch, indicating an expansion of 3 or 4 to 1 over the original latex film. The sponge height was uniform and the cell structure also very uniform. Although it is preferred to cause such high humidity blowing to occur shortly after incorporation of the blowing agent, I have found that compositions similar to the above, containing the blowing agent, will give a good sponge structure even after they have aged 48 hours at room temperature.

Example II

A compound of the recipe of Example I on other pieces of carpet gave a 3 to 1 blow ratio in 15 minutes at 90° C., a 3.5 to 1 blow ratio in 10 minutes at 100° C., and a 5 to 1 blow ratio in 3.5 minutes at 120° C.

Example III

Using azo-di-carbonamide instead of the p,p'-oxy-bis-(benzenesulfonylhydrazide) in the recipe of Example I gave a satisfactory foam sponge. The pH dropped from an initial pH of 11 to a pH of 9.5 after blowing.

Example IV

A compound of the recipe of Example I adjusted to a pH of 9.5 gave a 2.5 to 1 blow ratio at 110° C. in 8 minutes. Another compound of the recipe of Example I adjusted to a pH of 10.2 by addition of ammonia gave a 4 to 1 blow ratio at 110° C. in 10 minutes. Another compound of the recipe of Example I with an initial pH of 9.75 showed a drop in pH to 8.9 on blowing.

*Example V*

A synthetic rubber latex copolymer of 75 parts of butadiene and 25 parts of styrene of 60% solids concentration was compounded according to the following recipe:

|  | Dry | Wet |
| --- | --- | --- |
| Latex | 100 | 167 |
| Zinc Oxide | 3 | 5.5 |
| Sulfur | 2 | 4 |
| Accelerator | 1.5 | 3 |
| Antioxidant | 1 | 2.5 |
| Sorbitol | 5 | 5 |
| Trimene Base | 0.5 | 1 |
| Sodium Polyacrylate | 0.5 | 5 |
| Methyl Cellulose | 0.38 | 5 |

The sorbitol acts as a humectant, the addition of a humectant being desirable when the compound is to be blown in dry air. Other humectants, such as glycerine may be used to prevent the too rapid drying of the latex as it is frothed. Trimene base (triethyl trimethylene triamine) is an accelerator and also acts as a foam stabilizer. Eight parts (wet) of a 25% aqueous dispersion of p,p'-oxy-bis (benzenesulfonylhydrazide) was mixed into the latex compound and the pH was adjusted to 10 to 10.5. The thus fully compounded latex containing the blowing agent was aged at room temperature (75° F.) for about 16 hours (overnight). The compound was then spread on a carpet backing and heated in a dry-heat drier at 110°–115° C. with little or no humidity. An excellent foam sponge backing resulted.

The latex for preparing sponge rubber according to the present invention may be a natural rubber latex, or a butadiene polymer synthetic rubber latex, or mixtures of any of the same. Such butadiene polymer synthetic rubber latex may be an aqueous emulsion polymerizate of one or a mixture of butadienes-1,3 for example, butadiene-1,3, 2-methyl-butadiene-1,3 (isoprene), 2-chlorobutadiene-1,3 (chloroprene), piperylene and 2,3-dimethyl butadiene-1,3, or a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha olefine carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making latex sponge rubber which comprises shaping an alkaline rubber latex composition which contains a chemical selected from the group consisting of azo-dicarbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), and heating the latex whereby the latex is frothed by evolution of nitrogen and the froth is gelled by reduction of the pH of the latex, said latex being selected from the group consisting of natural rubber latex and butadiene polymer synthetic rubber latices.

2. The method of making latex sponge rubber which comprises shaping an alkaline rubber latex composition which contains a chemical selected from the group consisting of azo-di-carbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), and subjecting the latex to a temperature from 80° C. to 130° C. whereby to froth the latex and gel the froth, said latex being selected from the group consisting of natural rubber latex and butadiene polymer synthetic rubber latices.

3. The method of making latex sponge rubber which comprises shaping an alkaline rubber latex composition which contains a humectant and a chemical selected from the group consisting of azo-di-carbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), and subjecting the latex to a temperature from 80° C. to 130° C. whereby to froth the latex and gel the froth, said latex being selected from the group consisting of natural rubber latex and butadiene polymer synthetic rubber latices.

4. The method of making latex sponge rubber which comprises shaping an alkaline rubber latex composition which contains a chemical selected from the group consisting of azo-di-carbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), and subjecting the latex to an atmosphere at a temperature from 80° C. to 130° C. and a relative humidity of 50% to 100% whereby to froth the latex and gel the froth, said latex being selected from the group consisting of natural rubber latex and butadiene polymer synthetic rubber latices.

5. The method of making latex sponge rubber which comprises shaping an alkaline rubber latex composition which contains a chemical selected from the group consisting of azo-di-carbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), and subjecting the latex to an atmosphere at a temperature from 80° C. to 130° C. and a relative humidity of at least 70% whereby to froth the latex and gel the froth, said latex being selected from the group consisting of natural rubber latex and butadiene polymer synthetic rubber latices.

6. The method of making latex sponge rubber which comprises aging at room temperature for 4 to 48 hours an alkaline rubber latex composition which contains a chemical selected from the group consisting of azo-di-carbonamide, benzenesulfonylhydrazide, p,p'-oxy-bis(benzenesulfonylhydrazide), p,p'-methylene-bis(benzenesulfonylhydrazide), and p,p'-thio-bis(benzenesulfonylhydrazide), shaping the aged latex composition, and subjecting the shaped latex to an atmosphere at a temperature from 80° C. to 130° C. whereby to froth the latex and set the froth, said latex being selected from the group consisting of natural rubber latex and butadiene polymer synthetic rubber latices.

7. The method of making latex sponge rubber which comprises shaping an alkaline rubber latex composition containing 0.5 to 5 parts of azo-di-carbonamide per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

8. The method of making latex sponge rubber which comprises shaping an alkaline rubber latex composition containing 0.5 to 5 parts of an aryl sulfonyl hydrazide per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

9. The method of making latex sponge rubber which comprises shaping an alkaline rubber latex composition containing 0.5 to 5 parts of benzenesulfonylhydrazide per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

10. The method of making latex sponge rubber which comprises shaping an alkaline rubber latex composition containing 0.5 to 5 parts of p,p'-oxy-bis(benzenesulfonylhydrazide) per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

11. The method of making latex sponge rubber which comprises shaping an alkaline rubber latex composition containing 0.5 to 5 parts of p,p'-methylene-bis(benzenesulfonylhydrazide) per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

12. The method of making latex sponge rubber which comprises shaping an alkaline rubber latex composition containing 0.5 to 5 parts of p,p'-thio-bis(benzenesulfonylhydrazide) per 100 parts of rubber of the latex, and subjecting the latex to a temperature from 80° C. to 130° C. whereby to froth the latex sponge and gel the froth, said latex being selected from the group consisting of natural rubber latex and butadiene polymer synthetic rubber latices.

References Cited in the file of this patent
UNITED STATES PATENTS

| | | |
|---|---|---|
| 2,466,027 | Horney et al. | Apr. 5, 1949 |
| 2,540,040 | Baker | Jan. 30, 1951 |
| 2,552,065 | Schoene | May 8, 1951 |
| 2,626,933 | Lober et al. | Jan. 27, 1953 |

UNITED STATES PATENT OFFICE
CERTIFICATE OF CORRECTION

Patent No. 2,858,282                        October 28, 1958

James T. Fairclough

It is hereby certified that error appears in the above numbered patent requiring correction and that the said Letters Patent should read as corrected below.

Column 4, line 70, column 5, lines 3, 11 and 19, and column 6, lines 4 and 13, strike out "sponge", each occurrence.

Signed and sealed this 20th day of November 1962.

(SEAL)
Attest:

ERNEST W. SWIDER
Attesting Officer

DAVID L. LADD
Commissioner of Patents